United States Patent [19]

Donahue

[11] Patent Number: 4,880,964
[45] Date of Patent: Nov. 14, 1989

[54] SCANNABLE FRAUD PREVENTING COUPON

[75] Inventor: Patrick J. Donahue, Bell Mead, N.J.

[73] Assignee: Beatrice Foods Co., Chicago, Ill.

[21] Appl. No.: 620,741

[22] Filed: Jun. 14, 1984

[51] Int. Cl.⁴ .............................................. G06K 7/10
[52] U.S. Cl. .................................... 235/462; 235/460;
235/488; 235/494; 283/105; 283/903
[58] Field of Search ............... 235/380, 462, 468, 488,
235/412, 494; 283/77, 94, 105, 901, 903, 904

[56] References Cited
U.S. PATENT DOCUMENTS 3,580,489  5/1971  Oettinger ..................... 283/105 X
3,900,219  8/1975  D'Amato et al. .............. 283/903 X
4,033,611  7/1977  Johnsen ....................... 283/105 X
4,392,053  7/1983  Bockholt ....................... 235/468 X Primary Examiner—David L. Trafton
Attorney, Agent, or Firm—Shlesinger & Myers

[57] ABSTRACT

A scannable fraud preventing coupon or the like, comprising a first panel having a plurality of parallel bars providing a coded scannable image on a first surface thereof; a second panel secured to said first panel and including a portion thereof overlying said image; said image being scannable through said first and second panels; a series of lines disposed on said at least a portion of said second panel altering said image whereby scanning of said image is disrupted is disclosed.

16 Claims, 2 Drawing Sheets

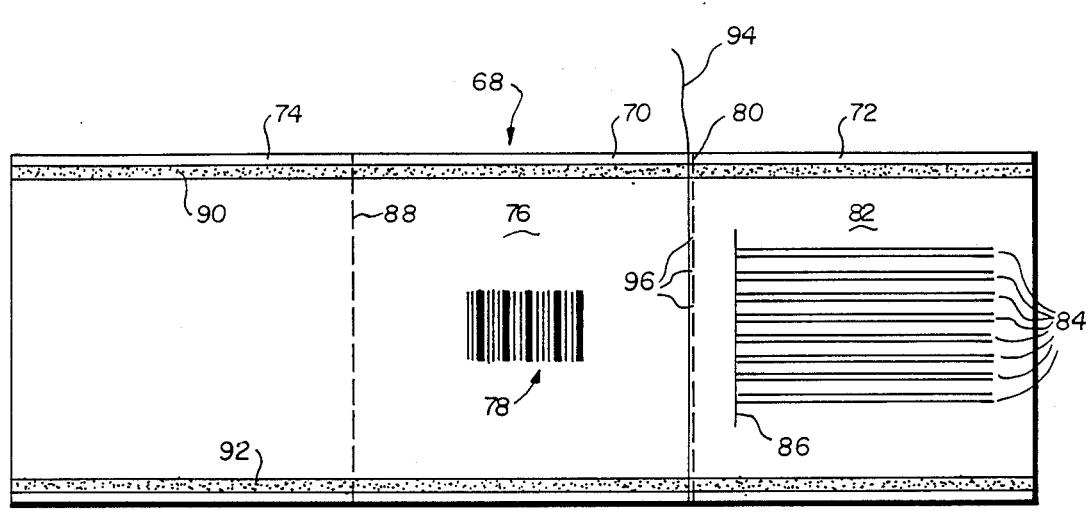
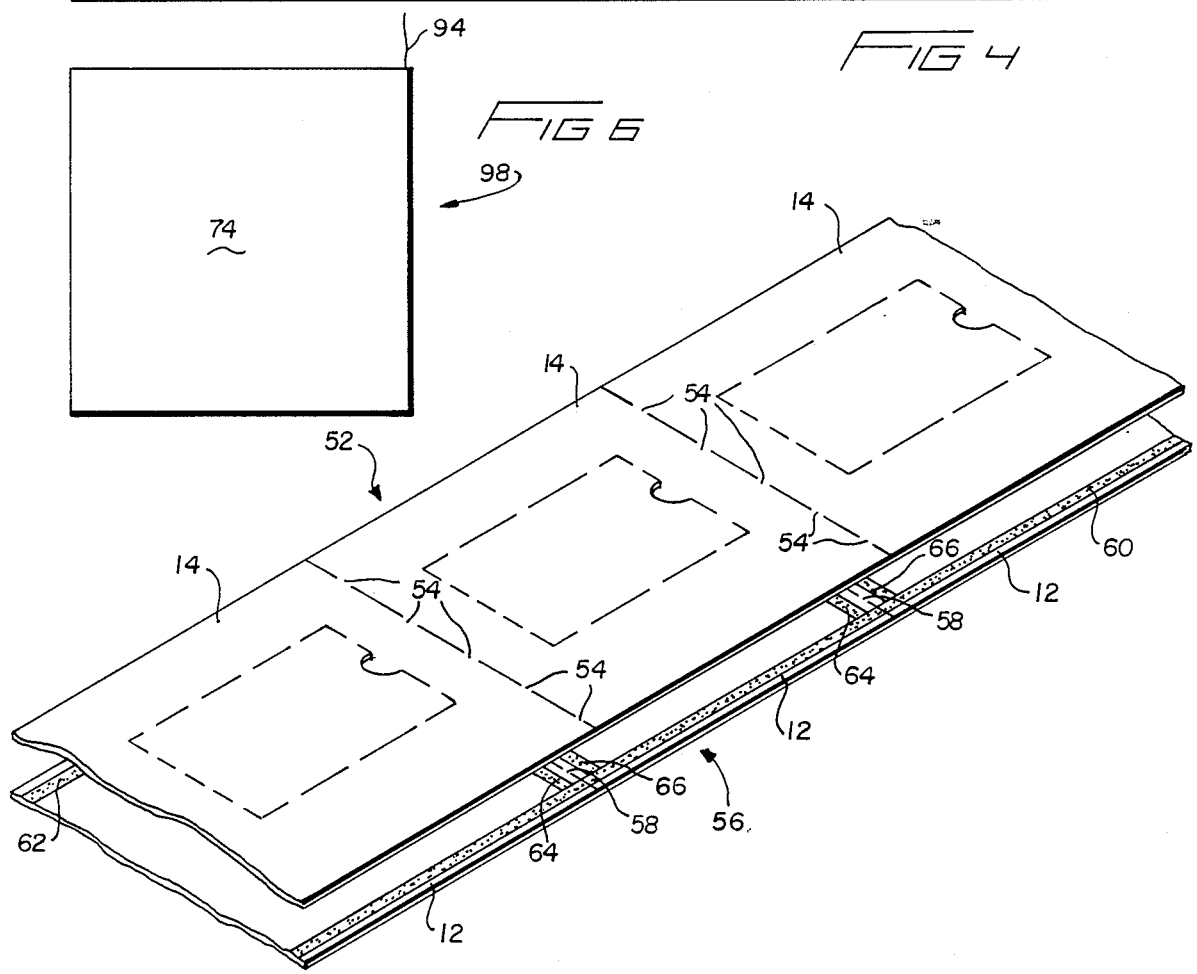

SCANNABLE FRAUD PREVENTING COUPON

BACKGROUND OF THE INVENTION

Retail establishments continously seek means for increasing traffic through a store. A promotional game will frequently be utilized and has for its purpose increased consumer awareness of a retail establishment while simultaneously indirectly increasing the purchases which a consumer makes in the store because of being attracted into the store by the promotional game. A promotional game must be relatively inexpensive to implement in order to permit mass distribution of the promotional game coupons so as to contact the greatest number of potential consumers. Consequently, the cost for producing the coupons must be very low in order to minimize the overhead costs associated with the game.

Promotional games, particularly those which are widely distributed through mass distributions, present the possibility of fraud by an individual capable of duplicating the coupons. Should an individual, particularly an employee of the retail establishment, be able to sort the large prize coupons from those with a less substantial prize reward, then the possibilities of fraud are most evident. While many retail establishments prohibit their employees from participating in the promotional games, this prohibition alone is not satisfactory The retail establishment utilizing a promotional game will obtain maximum benefit from the game if accurate records and accountings are maintained. These records and accountings should permit the retail establishment to keep records of which stores have most benefited from the promotional coupons, which stores and even which employees have received the most prize awarding coupons, during which hours are the coupons most utilized, as well as much additional information which may be readily appreciated by one skilled in the promotional game art.

Many retail establishments, particularly supermarkets, have recently begun to install equipment capable of scanning the Uniform Product Code (UPC) printed on many articles. This scanning equipment permits the retailer to scan the coded bars on the product and to interpret those bars so as to maintain accurate control of inventory and to provide greatly enhanced accounting records. The ordinary consumer is incapable of interpreting the information coded by the UPC. Consequently, UPC coding, when utilized in combination with a promotional game coupon, permits accurate accounting while preventing an employee or a consumer from sorting through the coupons.

Goodell, No. 700,761, (now abandoned) discloses multilayer railway ticket having means to prevent a consumer from reading the ticket prior to its being accepted. Goodell discloses an opaque strip of dyed paper which covers the destination and which prevents the destination from being read until the dyed strip is removed. Perforations are disposed within the ticket defining a tongue which cooperates with the dyeing strip so that the perforations must be torn in order to remove the dyeing strip and therefore serves to indicate to the conductor or ticket taker that the ticket has been previously opened in violation of the terms of the ticket. The Goodell ticket is a rather complicated structure which is expensive to manufacture and is therefore not suitable for use in a retail establishment promotional game.

Wilson, No. 3,211,470, discloses a coated coupon employing UPC coding. The UPC coding of Wilson is, however, disposed so as to be readily visible with the effect that it may be scanned in advance, thereby permitting employee fraud.

Jacobstein, et al, No. 3,180,808, discloses a chance ticket having a flexible tab retained by a tongue in a closed position. The prize is disposed beneath the tab and lifting of the tab breaks the tongue and permits the prize to be known. Jacobstein, et al, does not, however, utilize UPC coding.

Bachman, No. 4,241,942, discloses a secure contest card having an intermediate layer disposed between two outer layers. Various patterns are printed on the intermediate layer to defeat techniques and equipment capable of compromising the game. Bachman discloses an opaque mask which is disposed over the intermediate layer and which is readily removable by means of a coin or the like. The ticket of Bachman is, however, difficult to manufacture and provides no guidance in utilizing UPC coding in a promotional game.

OBJECTS AND SUMMARY OF THE INVENTION

In view of the above disadvantages of the prior art, a new promotional game coupon having means for preventing fraud while permitting accurate accounting records to be maintained is desirable. The coupon must be relatively simple and inexpensive to manufacture in order to permit mass distribution of the coupon to the greatest number of potential consumers. The coupon must contain irreversible safeguards to indicate and prevent premature scanning of the coupon. The safeguards must be readily apparent.

A primary object of the disclosed invention is to provide a scannable fraud preventing coupon which overcomes the disadvantages of the prior art promotional coupons.

An additional object of the disclosed invention is to provide a scannable fraud preventing coupon which utilizes UPC coding techniques in order to permit accurate accounting, distribution and use records to be maintained.

An additional object of the disclosed invention is to provide a scannable fraud preventing coupon which may be mass produced at relatively little cost.

Yet an additional object of the disclosed invention is to provide a scannable fraud preventing coupon having means for altering the UPC image in order to disrupt unauthorized scanning of the coupon.

Still an additional object of the disclosed invention is to provide a scannable fraud preventing coupon having means for irreversibly indicating that the coupon has been opened.

Yet a further object of the disclosed invention is to provide a scannable fraud preventing coupon having means to facilitate opening of the coupon which cooperates with the indicating means.

Yet a further object of the disclosed invention is to provide a fraud preventing coupon which is adhesively sealed and bonded to prevent unauthorized premature viewing of the coded UPC image.

A further object of the disclosed invention is to provide a scannable fraud preventing coupon which is manufactured from paper panels.

Yet a further object of the disclosed invention is to provide a scannable fraud preventing coupon which is manufactured in strip form.

Still yet another object of the disclosed invention is to provide a scannable fraud preventing coupon which must be scanned in order to determine if a prize is to be awarded.

Yet still another object of the disclosed invention is to provide a scannable fraud preventing coupon which has UPC image altering means on a surface disposed adjacent the UPC coding to thereby prevent scanning of the UPC image through the closed unopened coupon.

These and other objects and advantages of the invention will be readily apparent in view of the following description and drawings of the above described invention.

DESCRIPTION OF THE DRAWINGS

The above and other objects and advantages and novel features of the present invention will become apparent from the following detailed description of the preferred embodiment of the invention illustrated in the accompanying drawings, wherein:

FIG. 4 is a top plan view of a blank for manufacturing another embodiment of the coupon in FIG. 1;

FIG. 5 is a perspective view of two strips of coupon panels for mass producing the coupons of FIG. 1; and, FIG. 6 is a top plan view of the coupon of FIG. 4 in the closed position.

DESCRIPTION OF THE INVENTION

Figure 1:
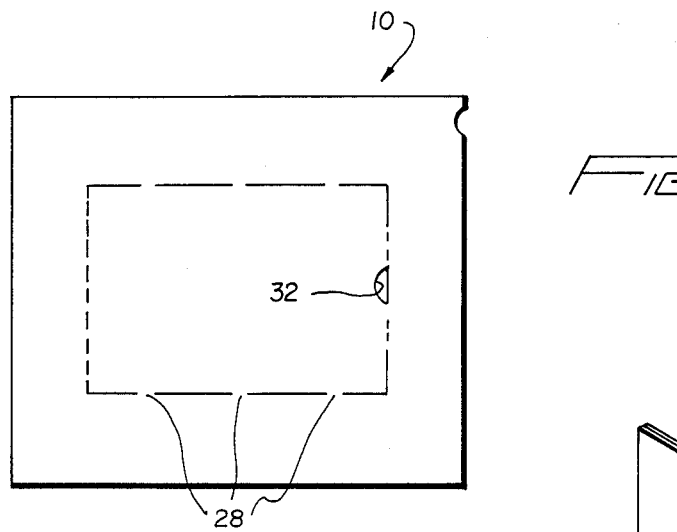
FIG. 1 is a top plan view of a closed scannable fraud preventing coupon constructed according to the invention.
Figure 2:
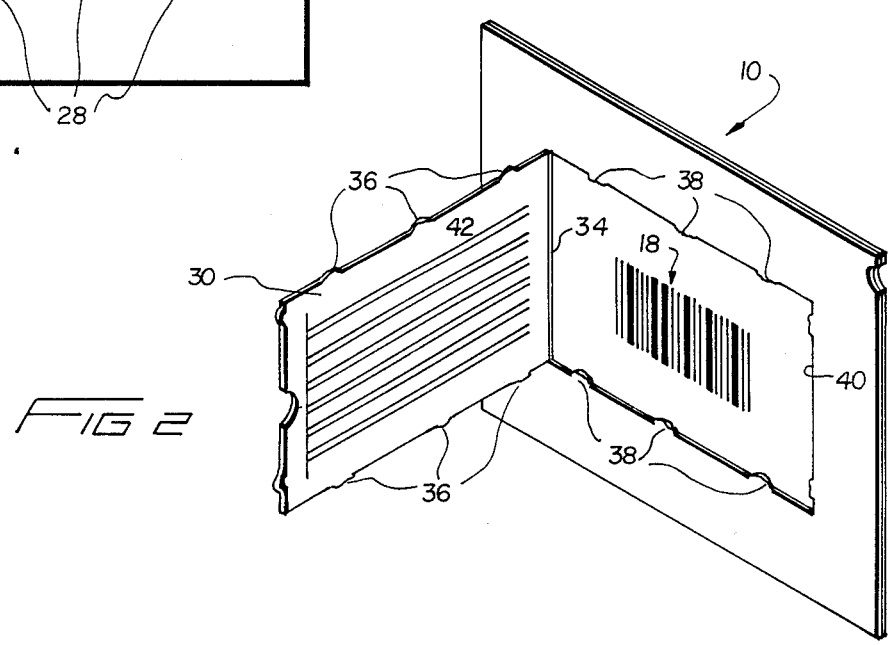
FIG. 2 is a perspective view of the coupon of Figure 1 in the opened condition.
Figure 3:
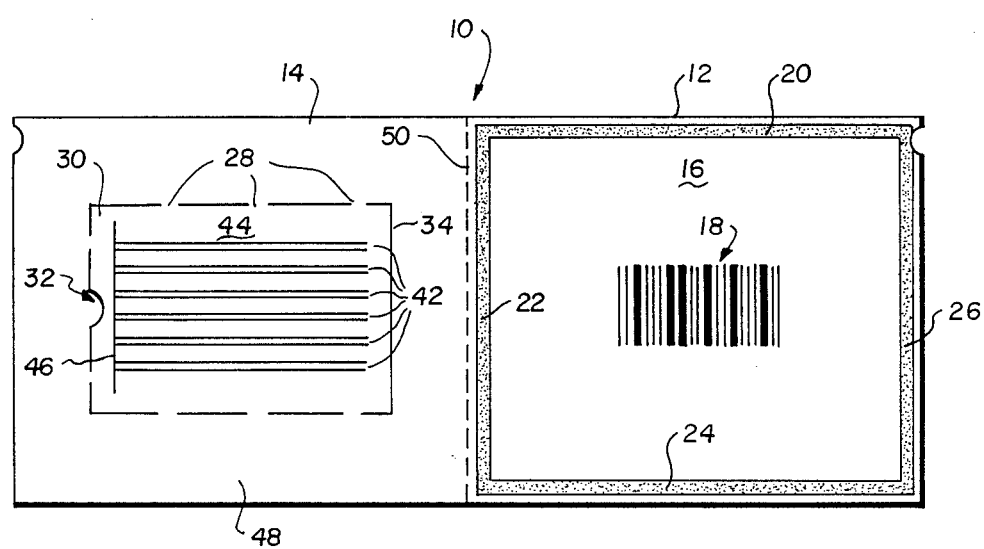
FIG. 3 is a top plan view of a blank used for manufacturing the coupon of FIG. 1.

A scannable fraud preventing coupon 10, as best shown in FIGS. 1-3, includes interconnected first panel 12 and second panel 14. First panel 12 and second panel 14 are, preferably, constructed and manufactured from paper sheets and have a planar rectangular configuration. The panels 12 and 14 are, preferably, manufactured from 80 pound paper. This weight paper imparts sufficient rigidity and strength to the coupon 10 to permit coupon 10 to be mass produced and to be capable of being handled by numerous individuals.

First panel 12 has a first surface 16 on which a plurality of spaced parallel bars 18 are imprinted or disposed for providing an image scannable by an electronic scanner (not shown) of a type well known in the art. The bars 18 are arrayed so as to be coded according to the requirements of the UPC. UPC coding permits interaction with a computer for thereby providing interpretation of the bars 18 while also permitting accurate accounting information to be maintained.

Second panel 14 is adhesively secured to panel 12 by peripherally disposed glue strips 20, 22, 24 and 26. While glue strips 20, 22, 24 and 26 are disclosed, one skilled in the art will appreciate that many others means for adhesively securing and bonding first panel 12 to second panel 14 are known. Similarly, while FIG. 3 discloses that glue strips 20, 22, 24 and 26 are disposed on first panel 12, one skilled in the art will appreciate that the glue strips 20, 22, 24 and 26 may be disposed on second panel 14. Glue strips 20, 22, 24 and 26 are disposed around the periphery of first panel 12 in order to bond the panels 12 and 14 together at their edges. This assures that the panels 12 and 14 may not be separated and thereby prevents unauthorized premature viewing of coded bars 18.

As best shown in FIGS. 1 and 3, a plurality of perforations 28 are provided in second panel 14 and arrayed to define a tongue 30 integral with second panel 14. Perforations 28 thereby define a weakened web permitting tongue 30 to be severed from second panel 14. Preferably, tongue 30 has a notch 32 to permit ease of separation of tongue 30 from second panel 14.

As best shown in FIG. 2, tongue 30 is flexibly connected to second panel 14 along fold line 34 which defines a hinge. Consequently, insertion of an object or a finger (not shown) through notch 32 and between tongue 30 and first panel 12 causes the weakened web to be severed. Tongue 30 is flexibly connected by fold line 34 to second panel 14 and may be angularly pivoted to permit viewing of bars 18. It will be noted in FIG. 2 that tufts 36 extend peripherally from tongue 30 after tongue 30 has been pulled upwardly and the weakened web defined by perforations 28 has been torn. Similar tufts 38 extend peripherally from pocket or aperture 40 in second panel 14. The tufts 36 and 38 are caused by the tearing of tongue 30 from second panel 14. The tufts 36 and 38 indicate to any observer that the tongue 30 has been torn from second panel 14 and that the weakened web defined by perforations 28 has been torn. These tufts 36 and 38 irreversibly indicate, consequently, that tongue 30 has been pulled open from pocket or aperture 40.

As best shown in FIGS. 2 and 3, a plurality of lines 42 are imprinted or disposed on first surface 44 of tongue 30. Spaced parallel lines 42 are arrayed to be generally transverse of coded bars 18 and thereby overlie bars 18 when the tongue 30 is integral with second panel 14. A line 46 is disposed adjacent notch 32 on first surface 44 and is connected to lines 42. Lines 42 may be dark colored and arrayed to simulate bars 18. This causes improper interpretation of the coding scheme. The image being scanned is thereby a composite of the bars 18 and the transverse lines 42. The scanning of this image is difficult or impossible because the electronic scanning equipment is adapted for scanning only one set of bars 18 or lines 42. Consequently, this composite image, which is not generally visible to the eye but is visible to the illuminated scanning equipment, confuses the scanning equipment.

When the coupon 10 has been peripherally sealed by glue strips 20, 22, 24 and 26 and the tongue 30 has not been severed from second panel 14, then the lines 42 alter the image defined by coded bars 18. Coded bars 18 are scannable through either of panels 12 and 14. Without the image altering lines 42, then the coded bars 18 could be scanned without the tongue 30 being opened. The lines 42 which overlie coded image 18 alter the image 18 and thereby disrupt scanning of the image 18 with the effect that the coded image 18 cannot be scanned until such time as the tongue 30 has been opened and pulled away from aperture 40. While lines 42 have been disclosed as being transverse of parallel coded bars 18, it should be obvious that the lines 42 may be angularly disposed or otherwise configured relative to the coded image 18 and still have the same effect of altering the image 18. Similarly, the lines 44 may be disposed in lines sets with two lines 42 for each of the parallel spaced line sets.

As best shown in FIG. 3, the coupon 10 may be manufactured from a single paper blank 48 which is folded along fold line 50 so that the second panel 14 overlies first panel 12, as best shown in FIGS. 1 and 2. The second panel 14 is merely folded along fold line 50 until it overlies and is in contact with first panel 12. Glue strips 20, 22, 24 and 26 maintain second panel 14 securely bonded to first panel 12.

It is frequently desirable that the coupons 10 be manufactured in strip form, as best shown in FIG. 5. Strip 52 comprises a plurality of second panels 14 interconnected by weakened webs defined by perforations 54. Second strip 56 comprised of a plurality of first panels 12 interconnected by weakened webs defined by perforations 58 is adhesively secured to strip 52. One skilled in the art will appreciate that the use of strips 52 and 56 permits glue strips 60 and 62 to be applied in a continous manner parallel to the longitudinal axis of the strips 52 and 56. Glue strips 64 and 66 may then be applied transverse of strips 60 and 62 and parallel to perforations 58. This, therefore, permits efficient manufacture of numerous coupons 10. Each coupon 10 may then be severed from the joined strips 52 and 54 by tearing along perforations 54 and 58. This permits a plurality of coupons 10 to be manufactured in strip form while also permitting the coupons 10 to be individually removed from the joined strips 52 and 56.

Another embodiment of the coupon 10 is shown in Figures 4 and 6. Blank 68 is used to manufacture this embodiment. A first panel 70 is integral with a second panel 72 and a third panel 74. First panel 70 has a first surface 76 on which UPC scannable image 78, which is similar to UPC scannable image 18, is imprinted. Integral second panel 72 extends from fold line 80 and is adapted for being folded along fold line 80 so as to be in an overlying relationship with first panel 70. Second panel 72 has a first surface 82 on which spaced parallel lines 84 are imprinted. Panel 72 is folded so that lines 84 are transverse of image 78 when second panel 72 is secured to first panel 70. Lines 84 are similar to lines 42 of coupon 10. Transverse line 86 is connected to lines 84. Transverse line 86 is parallel to and adjacent to fold line 80.

Third panel 74 is integral with first panel 70 and is foldable along fold line 88 to be overlying second panel 72 when the coupon is sealed. It will be noted in FIG. 4 that parallel glue strips 90 and 92 are longitudinally disposed along the peripheral edges of blank 68. Strips 90 and 92 seal panel 72 to first panel 70 and third panel 74 to second panel 72. This sealing prevents the unauthorized premature viewing of coded image 78. Similarly, lines 84 which overlie coded image 78 alter the image 78 should the coupon be scanned while second panel 72 overlies first panel 70.

Preferably a tear string or opening means 94 is secured to first panel 70 first surface 76 adjacent fold line 80. The tear string 94 permits ease in opening the coupon by merely pulling on the string 94. Image 78 may then be scanned.

Additionally, fold line 80 may include perforations 96 to permit easy tearing along fold line 80 by tear string 94. The tearing of string 94 also indicates that the coupon has been opened prematurely and without authorization.

As best shown in FIG. 6, coupon 98 has a generally rectangular configuration with tear string 94 extending outwardly from one edge thereof. Pulling on tear string 94 causes the coupon 98 to be severed along fold line 80 with the effect that coded image 78 may therefore be viewed and scanned. As was previously explained for coupon 10, the tearing apart of first panel 70 and second panel 72 along fold line 80 and perforations 96 causes tufts to extend from between the perforations 96. The tufts indicate that the coupon 98 has been prematurely opened.

OPERATION

The use of coupons 10 and 98 is relatively simple and yet provides the retail establishment with much valuable information. The coupons 10 and/or 98 are distributed to potential customers of the retail establishment. In order for the coded images 18 and 78 to be scanned, the coupons 10 and 98 must be brought to the retail establishment. The images 18 and 78 may only be interpreted by scanners and, consequently, the scanners, which are tied into a host computer, permit the retail establishment to keep highly accurate records. The host computer permits information to be accumulated on which stores the coupons are returned to, what time of day the coupons are returned, and which scanners scanned the winning coupons. This last piece of information prevents an employee from scanning the coupons in advance and then distributing them to compatriots. Should an employee attempt to separate winning coupons from the others by premature opening, scanning and sorting, then the large number of winning coupons at one scanning station in a short period of time will indicate fraud. Additionally, rapid scanning of coupons for sorting purposes would also be evident and indicate fraud. It can be seen, therefore, that the coupons 10 and 98 protect the integrity of the promotional game while also permitting accurate records of the game's value to be maintained.

While this invention has been described as having a preferred design, it is understood that it is capable of further modifications, uses and/or adaptations of the invention following in general the principles of the invention and including such departures from the present disclosure as come within known or customary practice in the art to which the invention pertains, and as may be applied to the central features herein before set forth, and fall within the scope of the invention of the limits of the appended claims.

What I claim is:

1. An optically scannable fraud preventing coupon or the like, comprising:
    (a) a first panel having a plurality of parallel bars providing a first coded optically scannable image on a first surface thereof;
    (b) a second panel secured to said first panel and including at least a portion thereof overlying said first coded scannable image;
    (c) said first coded scannable image being scannable through said first and second panels;
    (d) a series of parallel lines providing a second coded optically scannable image scannable through said first and second panels is disposed on said at least a portion of said second panel juxtaposed to said first image and the lines of said second image are angularly disposed relative to said bars for altering said first coded scannable image by creating a composite scanning image preventing scanning of said first coded scannable image through said secured together first and second panels;
    (e) means for indicating removal of said at least a portion of said second panel from overlying relation with said first coded scannable image; and, (f) means for removing said overlying at least a portion of said second panel to thereby permit scanning of said first coded scannable image.

2. The coupon as defined in claim 1, wherein:
(a) said lines being transverse of said bars.

3. The coupon as defined in claim 1, wherein:
(a) said lines include a plurality of line sets;
(b) each of said line sets including two of said lines; and,
(c) said line sets being equally spaced.

4. The coupon as defined in claim 1, wherein:
(a) a plurality of arrayed perforation means in said second panel define said at least a portion of said second panel; and,
(b) said perforation means define a weakened web adapted for being severed whereby removal of said at least a portion from overlying said image is irreversible indicated by tufts.

5. The coupon as defined in claim 4, wherein:
(a) a notch is provided for facilitating removal of said at least a portion from overlying said image.

6. The coupon as defined in claim 4, wherein:
(a) said at least a portion is flexibly secured to said second panel after removal from overlying said image.

7. The coupon as defined in claim 1, wherein:
(a) said first and second panels are adhesively secured.

8. The coupon as defined in claim 1, wherein:
(a) said second panel is integral with said first panel; and,
(b) said second panel extends from and is folded along a first fold line.

9. The coupon as defined in claim 7, wherein:
(a) a plurality of said first panels are interconnected for providing a first strip;
(b) perforation means are disposed between each of said first panels for permitting severing of each of said first panels from strip;
(c) a plurality of said second panels are interconnected for providing a second strip;
(d) perforation means are disposed between each of said second panels for permitting severing of each of said second panels from strip; and,
(e) said first strip and said second strip are secured together for providing a plurality of said coupons.

10. The coupon as defined in claim 1, wherein:
(a) said lines are disposed on a first surface of said second panel; and,
(b) said second panel first surface is disposed adjacent said first panel first surface.

11. The coupon as defined in claim 8, further comprising:
(a) a third panel integral with said first panel; and,
(b) said third panel extends from and is folded along a fold line whereby said third panel overlies said second panel.

12. The coupon as defined in claim 11, wherein:
(a) a plurality of perforation means are disposed along said first fold line; and,
(b) said perforation means are adapted for being severed for irreversibly indicating removal of said second panel from overlying said first panel.

13. The coupon as defined in claim 12, wherein:
(a) tear string means are secured to said first panel adjacent said first fold line for tearing said perforation means whereby removal of said second panel from overlying said first panel is facilitated.

14. The coupon as defined in claim 11, wherein:
(a) said first and second panels are adhesively secured; and,
(b) said second and third panels are adhesively secured.

15. The coupon as defined in claim 11, further comprising:
(a) said first, second and third panels define a coupon blank; and,
(b) at least a pair of spaced parallel adhesive means are disposed on said blank parallel to said lines for adhesively securing said panels when folded.

16. The coupon as defined in claim 1, wherein:
(a) adhesive means are peripherally disposed on one of said first and second panels for securing said first and second panels.

* * * * *